United States Patent [19]

Martin et al.

[11] Patent Number: 5,378,094

[45] Date of Patent: Jan. 3, 1995

[54] CARGO TIE-DOWN ARRANGEMENT FOR PICK-UP TRUCKS

[75] Inventors: James B. Martin, Wyandotte; George L. Rickett, Detroit, both of Mich.

[73] Assignee: Chrysler Corporation, Highland Park, Mich.

[21] Appl. No.: 188,858

[22] Filed: Jan. 31, 1994

[51] Int. Cl.⁶ .............................................. B60P 7/08
[52] U.S. Cl. ..................................... 410/112; 410/101; 248/499
[58] Field of Search ................ 410/90, 106, 108–110, 410/112–114, 101; 24/115 K, 265 CD; 248/499, 503, 505

[56] References Cited

U.S. PATENT DOCUMENTS

| | | | |
|---|---|---|---|
| 2,559,240 | 7/1951 | Wiggin | 24/265 CD |
| 2,610,587 | 9/1952 | Pietzsch | 410/114 |
| 2,876,712 | 3/1959 | Oakley | 410/112 |
| 3,550,343 | 12/1970 | Buske | 410/112 X |
| 3,842,756 | 10/1974 | Marulic | 410/113 X |
| 4,060,036 | 11/1977 | Palms | 248/503 X |
| 4,278,376 | 7/1981 | Hunter | 410/130 |
| 4,850,769 | 7/1989 | Matthews | 410/105 |
| 4,969,784 | 11/1990 | Yanke | 410/104 |

FOREIGN PATENT DOCUMENTS

| | | | |
|---|---|---|---|
| 578775 | 6/1959 | Canada | 410/112 |

*Primary Examiner*—Michael S. Huppert
*Assistant Examiner*—Stephen Gordon
*Attorney, Agent, or Firm*—Edward P. Barthel

[57] ABSTRACT

A flush cargo tie-down arrangement for a pick-up truck cargo floor supported on laterally extending U-shaped frame cross members secured to a sub frame by bolts. The tie-down arrangement, mounted below the upper surface of the cargo floor includes U-shaped tapping plates mounted in opposite end portions of one forward cross member and secured therein by said bolts, and a tie-down line attachment pin mounted across each tapping plate intermediate the sides thereof.

8 Claims, 3 Drawing Sheets

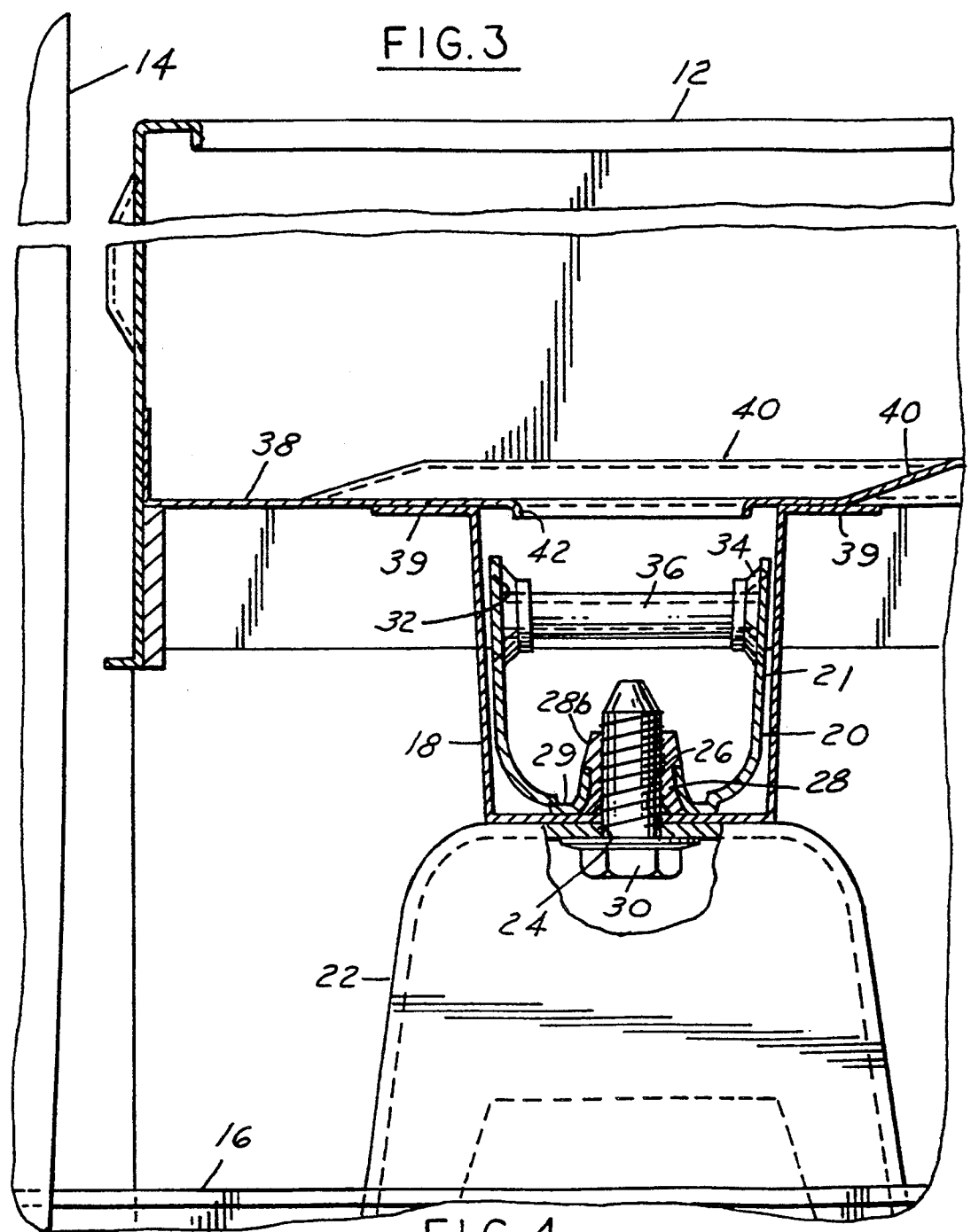
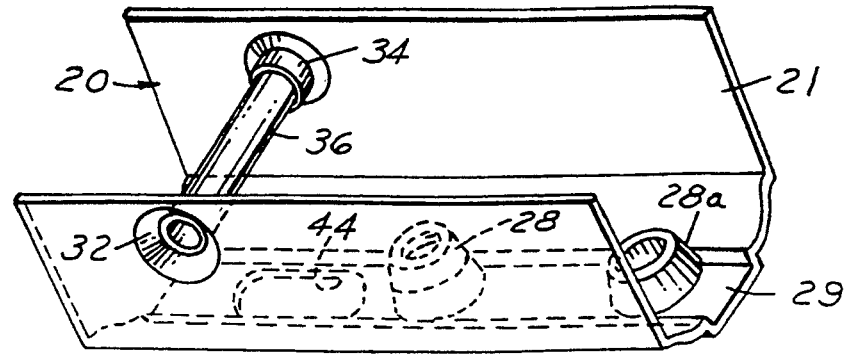

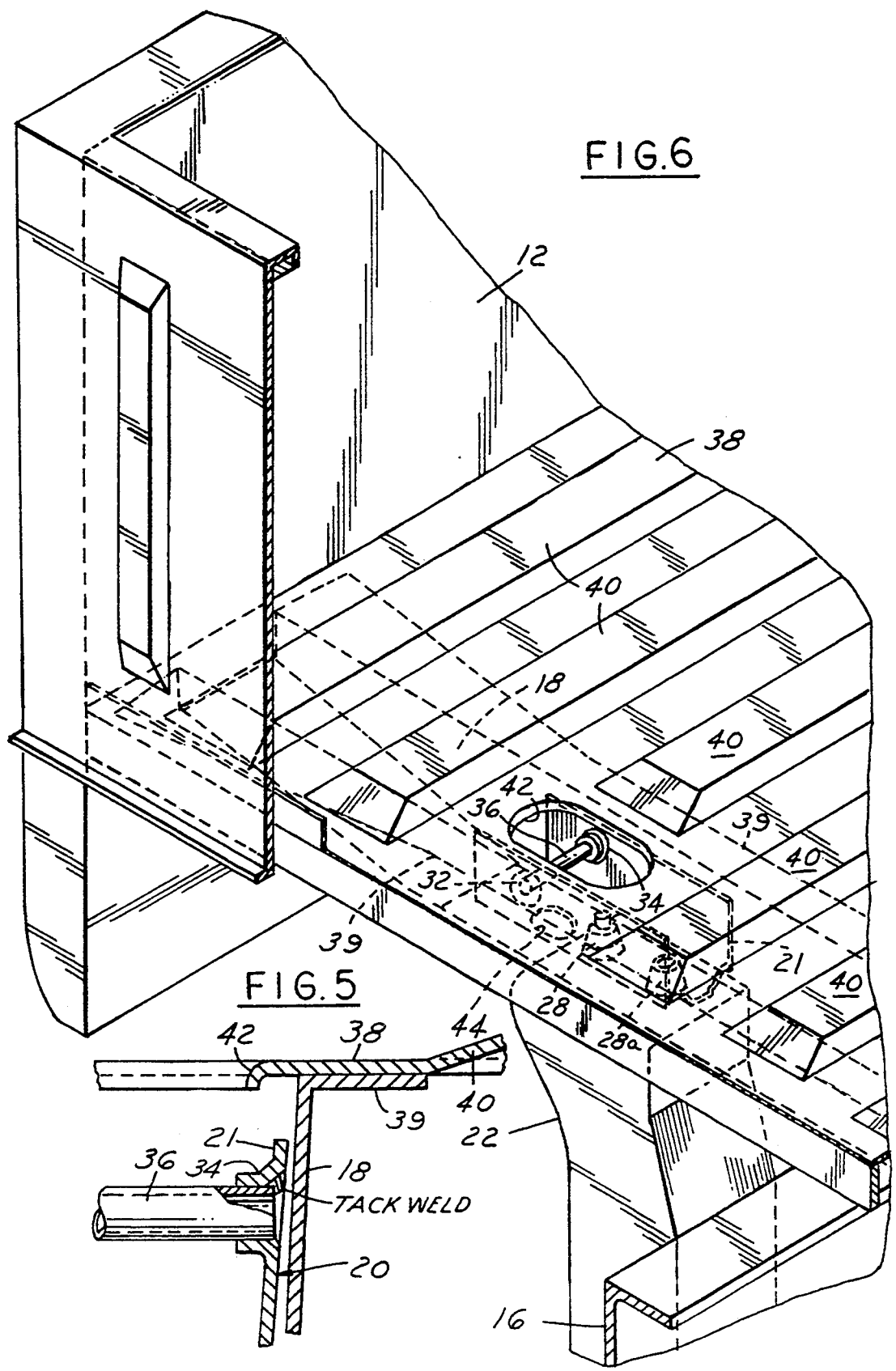

CARGO TIE-DOWN ARRANGEMENT FOR PICK-UP TRUCKS

TECHNICAL FIELD

This invention relates generally to pick-up trucks and, more particularly, to a cargo tie-down mechanism therefor.

BACKGROUND

Heretofore, pick-up truck cargo tie-down arrangements have generally consisted of rings or loops mounted on the side walls and/or front wall of the cargo box, or outward flanges formed on the upper edges of the side walls for the connection thereto of bungee cord hooks.

Various known tie-down devices are shown and described in U.S. Pat. Nos. 4,850,769; 4,969,784; and 4,278,376, all exposed within the cargo box.

DISCLOSURE OF THE INVENTION

A general object of the invention is to provide an improved pick-up truck cargo tie-down arrangement mounted flush with the floor of the cargo box, and having an access opening in the floor of the cargo box.

Another object of the invention is to provide a pick-up truck cargo box with a tie-down arrangement wherein tie-down line forces are transferred directly to the subjacent frame of the vehicle cargo-box and do not act on the box sidewalls.

A further object of the invention is to provide a cargo tie-down arrangement which is mounted below the upper surface of the cargo floor whereby a tie-down line can be routed upwardly from the box floor for lashing cargo to the vehicle box floor.

Still another object of the invention is to provide a cargo tie-down arrangement for a pick-up truck whose cargo box includes laterally extending U-shaped cross members secured to a frame by bolts, wherein the tie-down arrangement including U-shaped tapping plates mounted in opposite end portions of one forward cross member and secured therein by said bolts, and a pin mounted across each tapping plate intermediate the sides thereof.

These and other objects and advantages will become more apparent when reference is made to the following drawings and the accompanying description.

BRIEF DESCRIPTION OF THE DRAWINGS

FIG. 3 is an enlarged cross-sectional view taken along the plane of the line 3—3 of FIG. 2, and looking in the direction of the arrows;

FIG. 4 is a perspective view of a portion of the FIG. 3 structure;

FIG. 5 is an enlarged fragmentary cross-sectional view of a portion of the FIG. 3 structure; and FIG. 6 is a fragmentary perspective view of a cargo box and frame embodying the invention.

BEST MODE FOR CARRYING OUT THE INVENTION

Figure 1:
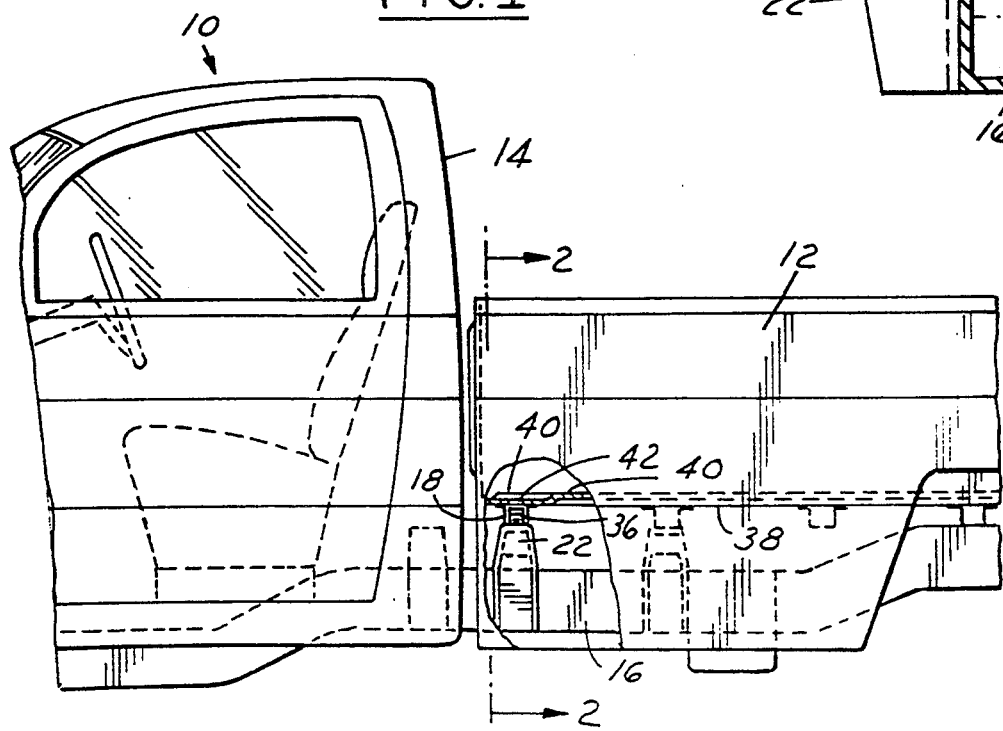
FIG. 1 is a fragmentary side elevational view, in partial cross section, of a pick-up truck embodying the invention.

Referring now to the drawings in greater detail, FIG. 1 illustrates a pick-up truck 10 having a cargo box 12 behind a cab 14, with both the cargo box and the cab mounted on a frame 16.

A plurality of U-shaped cross members 18 are formed as integral parts of the cargo box 12 and extend across the truck 10 for seating on the frame 16. A U-shaped tapping plate 20, having upstanding side plates 21, is nested in the first cross member 18 at each end thereof, adjacent opposite side walls of the cargo box. A plurality of mounting brackets 22 are secured to the frame 16, in alignment with the cross members 18.

As shown in FIG. 3, aligned openings 24 and 26 are formed in the frame 16 and the first cross member 18. A pair of extrusions 28 and 28a are formed on the bottom wall 29 of the tapping plate 20. The extrusion 28 has an internally threaded sleeve 28b secured therein, and the extrusion 28a serves as a tooling hole to facilitate proper alignment at assembly. A bolt 30 is mounted through each set of aligned openings 24 and 26, and threadedly secured in the sleeve 28b of the extrusion 28.

A pair of aligned extrusions 32 and 34 are formed on the opposite side walls of the tapping plate 20, offset from the extrusion 28 (FIGS. 4 and 5). A tie-down line attachment pin 36 is secured at its oppositely disposed ends in the extrusions 32 and 34. It is apparent from FIG. 3 that the pin 36 is confined between the side walls of the U-shaped cross member 18. As shown in FIG. 5, the pin 36 is tack welded within at least one extrusion 32 or 34 merely to prevent rattling therein.

Figure 2:
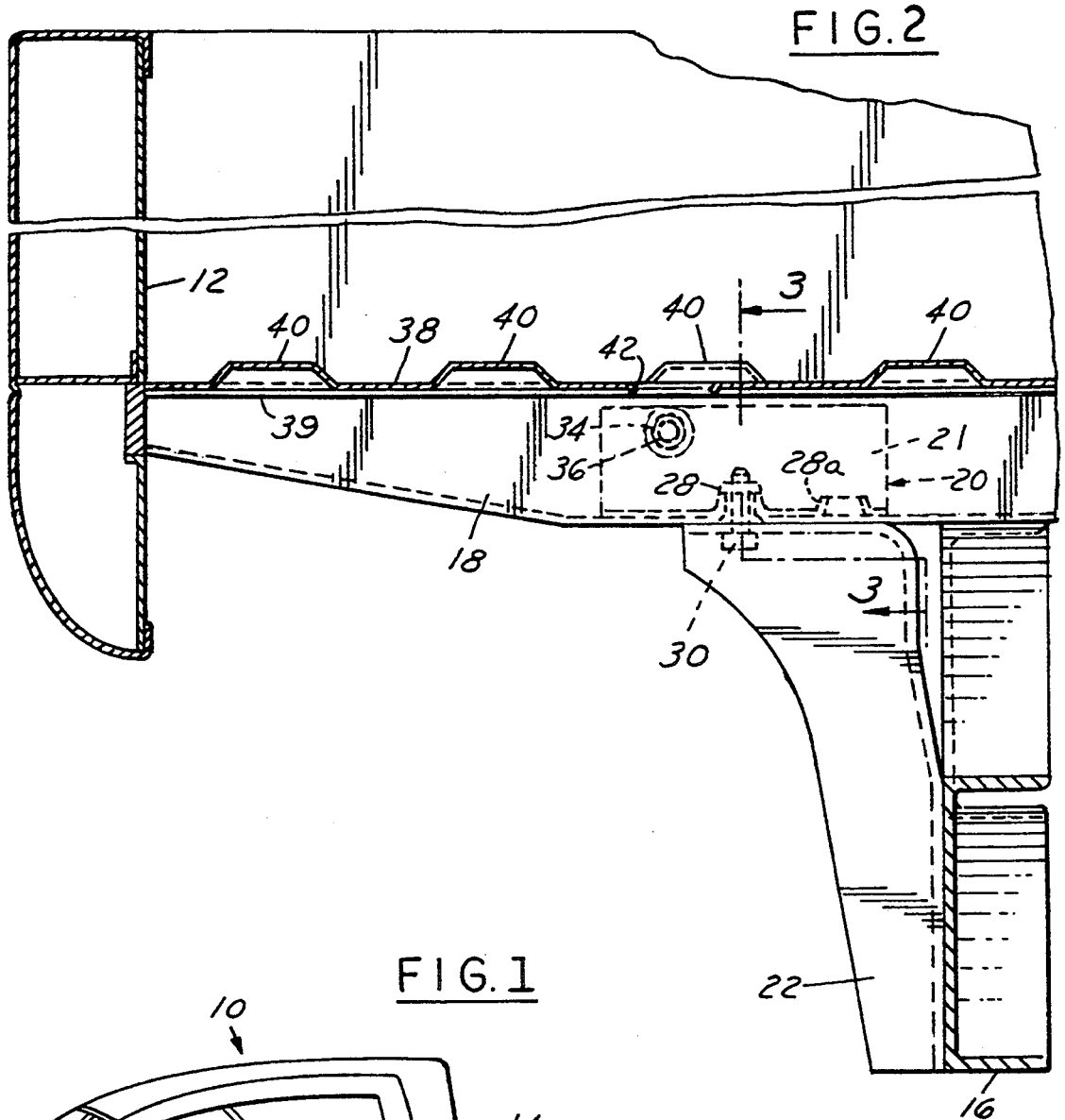
FIG. 2 is an enlarged cross sectional view taken along the plane of the line 2—2 of FIG. 1, and looking in the direction of the arrows.

A box floor 38, including equally spaced longitudinal ribs 40 (FIGS. 2, 3 and 5), is mounted on outwardly extending flanges 39 of the U-shaped cross members 18. A longitudinally elongated opening 42 (FIGS. 3 and 6) is formed in the floor 38 above each of the two oppositely disposed pins 36, providing access thereto for the purpose of tying down cargo being carried on the floor 38. The rib 40 laterally adjacent the oppositely disposed openings 42 is shorter (FIG. 6) than the other ribs, stopping short of the openings. A drain hole 44 is provided in the bottom plate 29 of the tapping plate 20.

Industrial Applicability

It should be apparent that the invention provides an improved easily accessed cargo tie-down mechanism which readily and efficiently supplements existing pick-up truck components, without adding any interfering elements within the cargo box.

While but one embodiment of the invention has been shown and described, other modifications thereof are possible within the scope of the following claims.

What is claimed is:

1. For use on a pick-up truck including a frame having mounting brackets secured thereon, with a cab mounted on the frame and a cargo box mounted on the mounting brackets, wherein the cargo box includes a cargo box floor and cross members, each cross member having a bottom wall and side walls, said cross members being secured to the mounting brackets by bolts extending upwardly through aligned openings formed in the mounting brackets and cross members, said cargo box floor extending across ends of the cross member side walls and thereby prohibiting access from above to the cross members, the improvement comprising cargo tie-down plate and pin means seated within one of said cross members and secured by said bolts thereto and further including at least one access opening formed in the cargo box floor above said plate and pin means.

2. The improvement described in claim 1, wherein said cargo tie-down plate and pin means includes U-shaped tapping plates nested in opposite end portions of one said cross member and each secured therein by one of said bolts, and a pin mounted across each tapping plate.

3. The improvement described in claim 1, wherein said one cross member is the forwardmost cross member.

4. The improvement described in claim 2, wherein each tapping plate includes an extrusion formed therein and a threaded sleeve secured in the extrusion for receiving said one of said bolts.

5. The improvement described in claim 2, wherein each tapping plate includes aligned extrusions formed therein for receiving said pin.

6. The improvement described in claim 5, wherein each pin is confined within said aligned extrusions by said one of said cross members.

7. The improvement described in claim 5, wherein each pin is tack welded to at least one of said aligned extrusions to prevent rattling therein.

8. The improvement described in claim 4, further including, a second extrusion formed in the bottom of each tapping plate and serving as an alignment tooling hole, and a drain hole formed in each said tapping plate.

* * * * *